(12) United States Patent
Ross et al.

(10) Patent No.: US 8,511,189 B2
(45) Date of Patent: Aug. 20, 2013

(54) DUAL CLUTCH MULTI-SPEED TRANSMISSION

(75) Inventors: Craig S. Ross, Ypsilanti, MI (US); Malcolm Kirkwood, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 864 days.

(21) Appl. No.: 12/626,244

(22) Filed: Nov. 25, 2009

(65) Prior Publication Data

US 2010/0147106 A1 Jun. 17, 2010

Related U.S. Application Data

(60) Provisional application No. 61/138,379, filed on Dec. 17, 2008.

(51) Int. Cl.
*F16H 3/08* (2006.01)

(52) U.S. Cl.
USPC .......................................................... 74/330

(58) Field of Classification Search
USPC ................................... 74/330, 331, 329, 340
See application file for complete search history.

(56) References Cited

U.S. PATENT DOCUMENTS

| | | | |
|---|---|---|---|
| 3,238,726 A | 3/1966 | Jandasek | |
| 4,549,443 A | 10/1985 | White | |
| 4,561,322 A | 12/1985 | Hausinger | |
| 4,576,063 A * | 3/1986 | Akashi et al. | 74/745 |
| 4,714,147 A | 12/1987 | Szodfridt et al. | |
| 4,721,002 A | 1/1988 | Horii | |
| 4,771,648 A | 9/1988 | Bardoll | |
| 5,009,118 A | 4/1991 | Raszkowski et al. | |
| 5,018,404 A | 5/1991 | Muller | |
| 5,125,282 A | 6/1992 | Bender et al. | |
| 5,259,260 A | 11/1993 | Schneider | |
| 5,267,635 A | 12/1993 | Peterson et al. | |
| 5,363,712 A | 11/1994 | Muller | |
| 5,365,800 A | 11/1994 | Muller | |
| 5,383,375 A | 1/1995 | Ogawa et al. | |
| 5,392,665 A | 2/1995 | Muller | |
| 5,474,505 A | 12/1995 | Seidel et al. | |
| 5,613,401 A | 3/1997 | Maurizio | |
| 5,640,882 A | 6/1997 | Mueller | |
| 5,711,186 A | 1/1998 | Lee | |
| 5,720,203 A | 2/1998 | Honda et al. | |
| 5,890,392 A | 4/1999 | Ludanek et al. | |
| 5,946,970 A * | 9/1999 | Fraley et al. | 74/325 |
| 5,950,781 A * | 9/1999 | Adamis et al. | 192/3.61 |
| 6,021,880 A | 2/2000 | Reed, Jr. et al. | |
| 6,044,719 A | 4/2000 | Reed, Jr. et al. | |
| 6,044,931 A | 4/2000 | Reed, Jr. et al. | |
| 6,655,226 B2 * | 12/2003 | Oguri | 74/333 |
| 7,040,186 B2 * | 5/2006 | Pollak | 74/330 |
| 7,258,033 B2 * | 8/2007 | Baldascini et al. | 74/331 |
| 7,677,378 B2 * | 3/2010 | Shintani | 192/219.5 |
| 2006/0278028 A1 * | 12/2006 | Caenazzo et al. | 74/331 |
| 2008/0034905 A1 * | 2/2008 | Hatori et al. | 74/330 |

* cited by examiner

*Primary Examiner* — Ha D Ho
*Assistant Examiner* — Jude Agendia

(57) ABSTRACT

A transmission includes an input member, an output transfer gear, first and second interconnecting members, a layshaft, a reverse member, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output transfer gear.

20 Claims, 1 Drawing Sheet

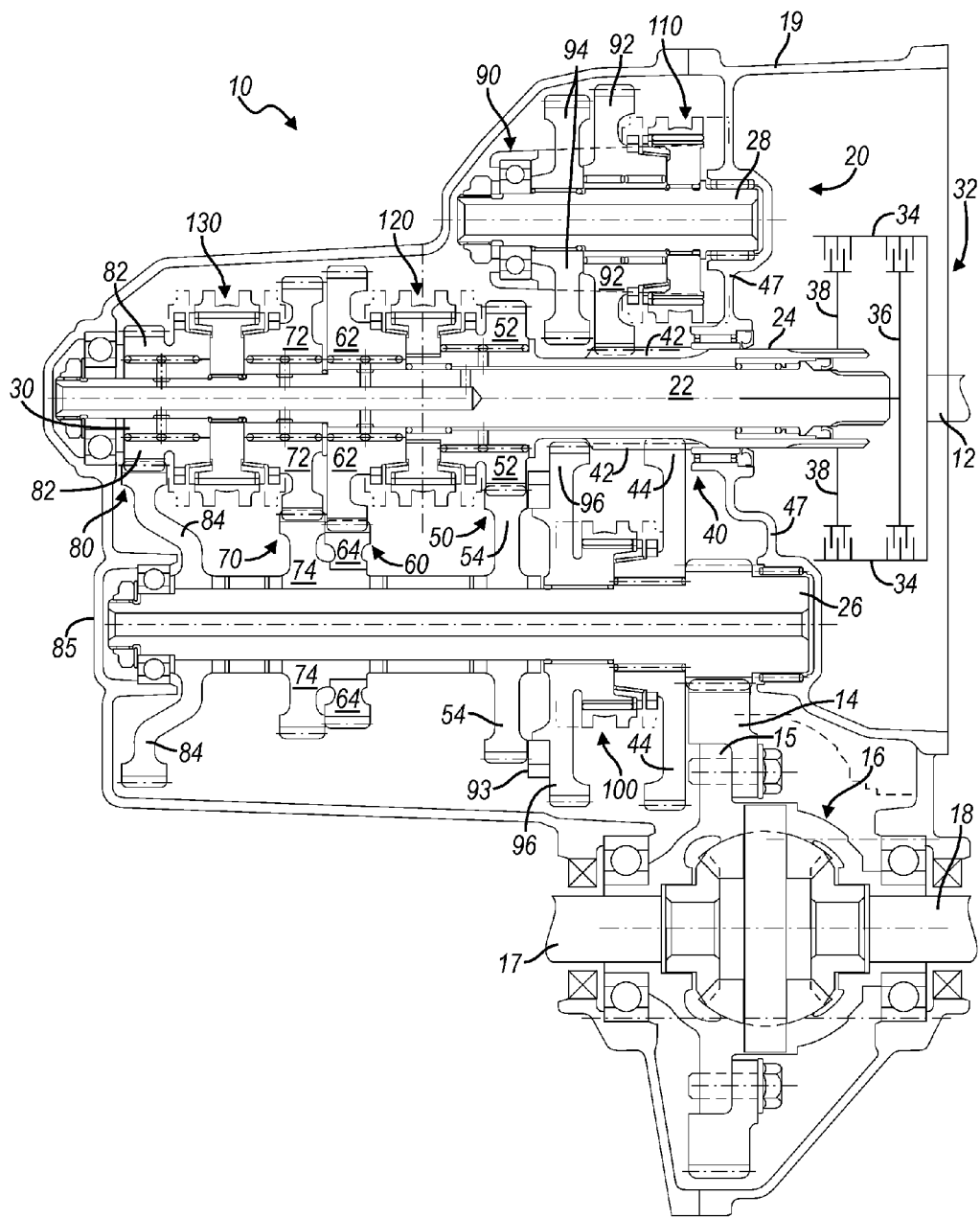

DUAL CLUTCH MULTI-SPEED TRANSMISSION

CROSS-REFERENCE TO RELATED APPLICATIONS

This application claims the benefit of U.S. Provisional Application No. 61/138,379, filed on Dec. 17, 2008, which is hereby incorporated in its entirety herein by reference.

TECHNICAL FIELD

The present disclosure relates to transmissions, and more particularly to a compact, dual clutch multiple speed transmission having two axes and a dedicated reverse shaft.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

A transmission is provided having an input member, an output transfer gear, first and second interconnecting members, a layshaft, an idler shaft, a plurality of co-planar gear sets, and a plurality of torque transmitting devices. The torque transmitting devices include a plurality of synchronizer assemblies and a dual clutch assembly. One synchronizer assembly is located on the idler shaft for providing a reverse gear ratio. The transmission is operable to provide at least one reverse speed ratio and a plurality of forward speed ratios between the input member and an output transfer gear.

In one example of the present invention, the transmission includes six co-planar gear sets.

In yet another example of the present invention, the transmission includes four synchronizer assemblies.

In yet another example of the present invention, the four synchronizer assemblies include two one-way synchronizers and two two-way synchronizers.

In yet another example of the present invention, the two one-way synchronizers are radially aligned and actuated by a common synchronizer actuator.

In yet another example of the present invention, the transmission is operable to provide at least five forward speed ratios.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 1 is a side cross-sectional view of an embodiment of a transmission according to the principles of the present invention.

DESCRIPTION

Referring to the drawings, wherein like reference numbers refer to like components, in FIG. 1 a multiple speed transmission is generally indicated by reference number 10. The transmission 10 includes an input member 12 and an output member or transfer gear 14. In the present embodiment, the input member 12 is a shaft and the transfer gear 14 is a gear, however those skilled in the art will appreciate that the input member 12 may be components other than shafts and the output member 14 may be a component, such as a shaft, other than a gear. The input member 12 is continuously connected with an engine (not shown) to provide a driving torque to the input member 12. The transfer gear 14 is connected with an output such as a housing 15 of a differential 16. The differential 16 transfers the torque delivered from the transfer gear 14 of the transmission 10 to first and second side axles 17, 18, and on to drive wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first interconnecting or intermediate member 22, a second interconnecting or intermediate member 24, a layshaft or countershaft 26, and a reverse member or idler shaft 28. The second interconnecting member 24 is a sleeve shaft that is concentric with the first interconnecting member 22. However, a portion 30 of the first interconnecting member 22 extends out from the second interconnecting member 24. The layshaft 26 and the reverse member 28 are each spaced apart from and parallel with the first and second interconnecting members 22, 24. The first and second interconnecting members define a first axis of rotation and the layshaft 26 defines a second axis of rotation.

A dual clutch assembly 32 is connected between the input member 12 and the first and second interconnecting members 22, 24. The dual clutch assembly 32 may be either a wet or dry clutch assembly. The dual clutch assembly 32 includes a clutch housing 34 connected for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates (not shown) mounted thereon that interact to form a friction clutch. The clutch element 36 is connected for common rotation with the first interconnecting member 22 and the clutch element 38 is connected for common rotation with the second interconnecting member 24. Thus, selective engagement of clutch element 36 with the clutch housing 34 connects the input member 12 for common rotation with the first interconnecting member 22. Selective engagement of clutch element 38 with the clutch housing 34 connects the input member 12 for common rotation with the second interconnecting member 24.

The gearing arrangement 20 also includes a plurality of co-planar, intermeshing gear sets 40, 50, 60, 70, 80, and 90, an idler gear 92, and a park gear 93. Co-planar gear set 40 includes gear 42 and gear 44. Gear 42 is connected for common rotation with the second interconnecting member 24 and intermeshes with gear 44. In the example provided, gear 42 includes gear teeth/splines formed on an outer surface of the second interconnecting member 24. However, it should be appreciated that gear 42 may be a separate gear structure fixed to the second interconnecting member 24 without departing from the scope of the present invention. Gear 44 is selectively connectable for common rotation with the layshaft 26. Gear set 40 is located adjacent a wall 47 of the transmission housing 19 proximate a front of the transmission 10.

Co-planar gear set 50 includes gear 52 and gear 54. Gear 52 is selectively connectable for common rotation with the second interconnecting member 24 and intermeshes with gear 54. Gear 54 is connected for common rotation with the layshaft 26. Gear set 50 is located adjacent gear set 40.

Co-planar gear set 60 includes gear 62 and gear 64. Gear 62 is selectively connectable for common rotation with the second interconnecting member 24 and intermeshes with gear 64. Gear 64 is connected for common rotation with the layshaft 26. Gear set 60 is located adjacent gear set 50.

Co-planar gear set 70 includes gear 72 and gear 74. Gear 72 is selectively connectable for common rotation with the first interconnecting member 22 and intermeshes with gear 74. Gear 74 is connected for common rotation with the layshaft 26. Gear set 70 is located adjacent gear set 60.

Co-planar gear set 80 includes gear 82 and gear 84. Gear 82 is selectively connectable for common rotation with the first interconnecting member 22 and intermeshes with gear 84. Gear 84 is connected for common rotation with the layshaft 26. Gear set 80 is located between gear set 70 and an end wall 85 of the transmission housing 19.

Co-planar or reverse gear set 90 includes gear 94 and gear 96. Gear 94 is connected for common rotation with the reverse member 28 and intermeshes with gear 96. Gear 96 is connected for common rotation with the layshaft 26. Gear set 90 is located between gear set 40 and gear set 50.

Idler gear 92 is selectively connectable for common rotation with the reverse member 28 and intermeshes with gear 42 of gear set 40. Alternatively, idler gear 92 may be connected to the second interconnecting member 24 via a gear structure or gear teeth/splines that are separate from gear 42.

Park gear 93 is connected for common rotation with gear 96. A park pawl (not shown) is selectively engageable with the park gear 96 to place the transmission 10 in a park mode of operation.

Finally, the transfer gear 14 is connected for common rotation with the layshaft 26. The transfer gear 14 is located between the co-planar gear set 40 and the wall 47 of the transmission housing 19.

The transmission 10 further includes a plurality of selectively engageable synchronizer assemblies 100, 110, 120, and 130. Synchronizers 100 and 110 are single sided synchronizers that generally include a shift fork (not shown) that is bi-directionally translated by an actuator (not shown) into one engaged position and a neutral or disengaged position. For example, synchronizer 100 is selectively engageable to connect gear 44 with the layshaft 26 for common rotation therewith. Synchronizer 110 is selectively engageable to connect gear 92 with the reverse member 28 for common rotation therewith. Synchronizers 100 and 110 are radially aligned with one another, thereby saving axial space. In one embodiment, synchronizers 100 and 110 share a common synchronizer actuator (not shown). Accordingly, synchronizer 100 and synchronizer 110 engage in opposite directions relative to one another. For example, synchronizer 100 connects gear 44 with the layshaft 26 when the actuator moves the synchronizer 100 to the right while synchronizer 110 connects gear 92 with the reverse member 28 when the actuator moves the synchronizer 110 to the left. The synchronizer actuator may be any bi-directional electro-hydraulic or electro-mechanical actuator without departing from the scope of the present invention. An example of a suitable synchronizer actuator is shown in commonly assigned U.S. Patent Application Publication No. 2008-0236315-A1 filed Mar. 14, 2008, hereby incorporated by reference as if fully disclosed herein.

Synchronizers 120 and 130 are double sided synchronizers and generally include a shift fork (not shown) that is bi-directionally translated by an actuator (not shown) into at least two engaged positions and a neutral or disengaged position. For example, synchronizer 120 is selectively engageable to connect gear 52 with the second interconnecting member 24 for common rotation therewith and is selectively engageable to connect gear 62 with the second interconnecting member 24 for common rotation therewith. Synchronizer 130 is selectively engageable to connect gear 72 with the first interconnecting member 22 for common rotation therewith and is selectively engageable to connect gear 82 with the first interconnecting member 22 for common rotation therewith.

The transmission 10 is capable of transmitting torque from the input shaft 12 to the transfer gear 14 in at least five forward torque ratios and at least one reverse torque ratio. Each of the forward torque ratios and the reverse torque ratio is attained by selective engagement of the dual clutch assembly 32 and one or more of the synchronizer assemblies 100, 110, 120, and 130. Through each gear ratio, the clutches 36 and 38 alternately engage and disengage. Those skilled in the art will readily understand that a different speed ratio is associated with each torque ratio.

It should be appreciated that each individual gear set 40, 50, 60, 70, 80, and 90 and idler gear 92 provides one or more forward and/or reverse gear ratio upon selective engagement of the synchronizer assemblies 100, 110, 120, and 130 and that which synchronizer and which gear set are associated with which forward or reverse speed ratio may vary without departing from the scope of the present invention.

For example, to establish the reverse torque ratio, clutch element 38 is engaged to couple the input member 12 with the second interconnecting member 24 and synchronizer 110 is engaged to connect idler gear 92 with the reverse member 28. Input torque from the input shaft 12 is transferred through the dual clutch assembly 32 to the second interconnecting member 24, through gear 42 to gear 92, through the reverse member 28 to gear 94, from gear 94 to gear 96, and through the layshaft 26 to the transfer gear 14.

To establish a first forward torque ratio (i.e. a 1st gear), clutch element 38 is engaged to couple the input member 12 with the second interconnecting member 24 and synchronizer 100 couples gear 44 to the layshaft 26. Input torque from the input member 12 is transferred through the dual clutch assembly 32 to the second interconnecting member 24, through gear 42 to gear 44, and through the layshaft 26 to the transfer gear 14.

To establish a second forward torque ratio (i.e. a 2nd gear), clutch element 36 is engaged to couple the input member 12 with the first interconnecting member 22 and synchronizer 130 couples gear 82 to the first interconnecting member 22. Input torque from the input member 12 is transferred through the dual clutch assembly 32 to the first interconnecting member 22, through gear 82 to gear 84, and through the layshaft 26 to the transfer gear 14.

To establish a third forward torque ratio (i.e. a 3rd gear), clutch element 38 is engaged to couple the input member 12 with the second interconnecting member 24 and synchronizer 120 couples gear 52 to the second interconnecting member 24. Input torque from the input member 12 is transferred through the dual clutch assembly 32 to the second interconnecting member 24, through gear 52 to gear 54, and through the layshaft 26 to the transfer gear 14.

To establish a fourth forward torque ratio (i.e. a 4th gear), clutch element 36 is engaged to couple the input member 12 with the first interconnecting member 22 and synchronizer 130 couples gear 72 to the first interconnecting member 22. Input torque from the input member 12 is transferred through the dual clutch assembly 32 to the first interconnecting member 22, through gear 72 to gear 74, and through the layshaft 26 to the transfer gear 14.

To establish a fifth forward torque ratio (i.e. a 5th gear), clutch element 38 is engaged to couple the input member 12 with the second interconnecting member 24 and synchronizer 120 couples gear 62 to the second interconnecting member 24. Input torque from the input member 12 is transferred through the dual clutch assembly 32 to the second interconnecting member 24, through gear 62 to gear 64, and through the layshaft 26 to the transfer gear 14.

Again, it should be appreciated that which of the gear sets 40, 50, 60, 70, 80, and 90 are associated with which forward and reverse torque ratio may be changed from the above example without departing from the scope of the present invention.

The present invention contemplates that a variety of torque ratios (i.e., the ratio of torque of the transfer gear 14 to the input member 12) are achievable through the selection of tooth counts of the gears of the transmission 10. Moreover, the present invention advantageously provides synchronizer 110 to be radially aligned with synchronizer 100 to create a more compact arrangement. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

We claim the following:

1. A transmission comprising:
   an input shaft;
   an output;
   a first intermediate shaft;
   a second intermediate shaft concentric with the first intermediate shaft;
   a dual clutch assembly selectively engageable to couple the input shaft with one of the first and second intermediate shafts;
   a countershaft;
   an idler shaft;
   a first selectable set of gears selectively connectable for common rotation with the first intermediate shaft and intermeshing with a first set of gears connected for common rotation with the countershaft to form a first plurality of co-planar gear sets;
   a second selectable set of gears selectively connectable for common rotation with the second intermediate shaft and intermeshing with a second set of gears connected for common rotation with the countershaft to form a second plurality of co-planar gear sets;
   a first gear connected for common rotation with the second intermediate shaft and intermeshing with a first selectable gear selectively connectable for common rotation with the countershaft to form a first co-planar gear set;
   a second gear connected for common rotation with the second intermediate shaft and intermeshing with a second selectable gear selectively connectable for common rotation with the idler shaft to form a second co-planar gear set;
   a third gear connected for common rotation with the idler shaft and intermeshing with a fourth gear connected for common rotation with the countershaft for transferring torque from the idler shaft to the countershaft; and
   a transfer gear connected to the countershaft for transferring torque from the countershaft to the output.

2. The transmission of claim 1 further comprising a first synchronizer for connecting the first selectable gear to the countershaft.

3. The transmission of claim 2 further comprising a second synchronizer for connecting the second selectable gear to the idler shaft.

4. The transmission of claim 3 wherein the first synchronizer and the second synchronizer are radially aligned.

5. The transmission of claim 4 wherein the first synchronizer and the second synchronizer are actuated by a common synchronizer actuator.

6. The transmission of claim 1 wherein the second co-planar gear set is operable to provide a reverse gear ratio between the input shaft and the output.

7. The transmission of claim 1 wherein the first co-planar gear set is operable to provide a first gear ratio between the input shaft and the output.

8. The transmission of claim 1 wherein the first plurality of co-planar gear sets are operable to provide a second gear ratio and a fourth gear ratio between the input shaft and the output.

9. The transmission of claim 1 wherein the second plurality of co-planar gear sets are operable to provide a third gear ratio and a fifth gear ratio between the input shaft and the output.

10. The transmission of claim 1 wherein the output is a housing of a differential.

11. The transmission of claim 1 wherein the idler shaft and countershaft are supported for rotation by a transmission housing wall located between the dual clutch assembly and the idler shaft and countershaft.

12. A transmission comprising:
    an input shaft;
    an output;
    a first intermediate shaft;
    a second intermediate shaft concentric with the first intermediate shaft;
    a dual clutch assembly selectively engageable to couple the input shaft with one of the first and second intermediate shafts;
    a countershaft;
    an idler shaft;
    a first co-planar gear set having a first gear connected for common rotation with the second intermediate shaft and intermeshing with a second gear selectively connectable for common rotation with the countershaft;
    a second co-planar gear set having a first gear selectively connectable for common rotation with the first intermediate shaft and intermeshing with a second gear connected for common rotation with the countershaft;
    a third co-planar gear set having a first gear selectively connectable for common rotation with the second intermediate shaft and intermeshing with a second gear connected for common rotation with the countershaft;
    a fourth co-planar gear set having a first gear selectively connectable for common rotation with the first intermediate shaft and intermeshing with a second gear connected for common rotation with the countershaft;

a fifth co-planar gear set having a first gear selectively connectable for common rotation with the second intermediate shaft and intermeshing with a second gear connected for common rotation with the countershaft;

a sixth co-planar gear set having a first gear connected for common rotation with the second intermediate shaft and intermeshing with a second gear selectively connectable for common rotation with the idler shaft;

a first transfer gear connected for common rotation with the idler shaft and intermeshing with a second transfer gear connected for common rotation with the countershaft for transferring torque from the idler shaft to the countershaft; and a third transfer gear connected to the countershaft for transferring torque from the countershaft to the output, and wherein the transmission is operable to provide at least five forward gear ratios and one reverse gear ratio between the input shaft and the output.

13. The transmission of claim 12 further comprising a first synchronizer for connecting the second gear of the first co-planar gear set with the countershaft.

14. The transmission of claim 13 further comprising a second synchronizer for connecting the second gear of the sixth co-planar gear set with the idler shaft.

15. The transmission of claim 14 wherein the first synchronizer and the second synchronizer are radially aligned and axially offset.

16. The transmission of claim 15 wherein the first synchronizer and the second synchronizer are actuated by a common synchronizer actuator.

17. The transmission of claim 12 further comprising a third synchronizer for connecting the first gears of the second and fourth co-planar gear sets with the first intermediate member.

18. The transmission of claim 12 further comprising a fourth synchronizer for connecting the first gears of the third and fifth co-planar gear sets with the second intermediate member.

19. The transmission of claim 12 wherein the first co-planar gear set is operable to provide a first gear ratio between the input shaft and the output, the second co-planar gear set is operable to provide a second gear ratio between the input shaft and the output, the third co-planar gear set is operable to provide a third gear ratio between the input shaft and the output, the fourth co-planar gear set is operable to provide a fourth gear ratio between the input shaft and the output, the fifth co-planar gear set is operable to provide a fifth gear ratio between the input shaft and the output, and the sixth co-planar gear set is operable to provide a reverse gear ratio between the input shaft and the output.

20. The transmission of claim 19 wherein the first co-planar gear set is axially adjacent the dual clutch assembly, the sixth co-planar gear set is axially adjacent the first co-planar gear set, the third co-planar gear set is axially adjacent the sixth co-planar gear set, the fifth co-planar gear set is axially adjacent the third co-planar gear set, the fourth co-planar gear set is axially adjacent the fifth co-planar gear set, and the second co-planar gear set is axially adjacent the fourth co-planar gear set and an end wall of a transmission housing.

* * * * *